(12) United States Patent
Yeh et al.

(10) Patent No.: US 6,612,743 B1
(45) Date of Patent: Sep. 2, 2003

(54) WAVELENGTH DIVISION MULTIPLEXED OPTICAL SOLITONS

(75) Inventors: Cavour Yeh, Los Angeles, CA (US); Larry A. Bergman, Van Nuys, CA (US)

(73) Assignee: California Institute of Technology, Pasadena, CA (US)

( * ) Notice: Subject to any disclaimer, the term of this patent is extended or adjusted under 35 U.S.C. 154(b) by 125 days.

(21) Appl. No.: 09/658,855

(22) Filed: Sep. 11, 2000

Related U.S. Application Data

(60) Provisional application No. 60/153,276, filed on Sep. 9, 1999.

(51) Int. Cl.[7] .............................. G02B 6/28; G02B 6/02; G02B 6/16; H04J 14/02
(52) U.S. Cl. .......................... 384/24; 385/123; 359/124
(58) Field of Search ................................ 385/24, 88, 92, 385/123; 359/115, 124

(56) References Cited

U.S. PATENT DOCUMENTS

| | | | | |
|---|---|---|---|---|
| 5,035,481 A | * | 7/1991 | Mollenauer | 385/123 |
| 5,473,458 A | * | 12/1995 | Mamyshev et al. | 359/161 |
| 5,502,588 A | * | 3/1996 | Abram | 359/154 |
| 6,201,916 B1 | * | 3/2001 | Eggleton et al. | 385/24 |
| 6,373,608 B1 | * | 4/2002 | Desurvire et al. | 359/124 |
| 6,411,408 B1 | * | 6/2002 | Dennis et al. | 359/124 |

* cited by examiner

Primary Examiner—Georgia Epps
Assistant Examiner—Alicia Harrington
(74) Attorney, Agent, or Firm—Fish & Richardson P.C.

(57) ABSTRACT

A technique of setting powers and shape of beams to allow optical solitons to exist on WDM beams in fibers.

19 Claims, 1 Drawing Sheet

WAVELENGTH DIVISION MULTIPLEXED OPTICAL SOLITONS

CROSS-REFERENCE TO RELATED APPLICATIONS

This application claims benefit of U.S. Provisional application No. 60/153,276, filed Sep. 9, 1999.

STATEMENT AS TO FEDERALLY-SPONSORED RESEARCH

The invention described herein was made in the performance of work under a NASA contract, and is subject to the provisions of Public Law 96-517 (U.S.C. 202) in which the contractor has elected to retain title.

BACKGROUND

A soliton is a light pulse that maintains its shape over a long distance. A soliton wave does not broaden, does not loose its shape and does not substantially weaken as it travels across a particular medium. This means that better transmission and fewer repeaters are required. Solitons have been known to carry 5 gigabits of information per second over 15,000 kilometers or 10 gigabits per second over 11,000 kilometers.

Different ways have been known to create the soliton in a fiber.

However, wavelength division multiplexed systems have provided a challenge for soliton communications. In wavelength division multiplexing, multiple beams are provided. Each of the beams has its own wavelength. This produces, however, complex non-linear interaction between the propagating pulses on these beams. This non-linear interaction has hampered the existence of solitons in WDM beams in fibers.

Attempts have been made to compensate for the effects.

SUMMARY

The present application teaches modification of various parameters of an optical system in order to produce solitons for optical communications through an optical fiber. The operation is done by setting the parameters of the pulses on these beams that will be launched into the fibers according to a specified relationship.

BRIEF DESCRIPTION OF THE DRAWINGS

These and other aspects will now be described in detail with reference to the accompanying drawings, wherein.

DETAILED DESCRIPTION

Figure 1:
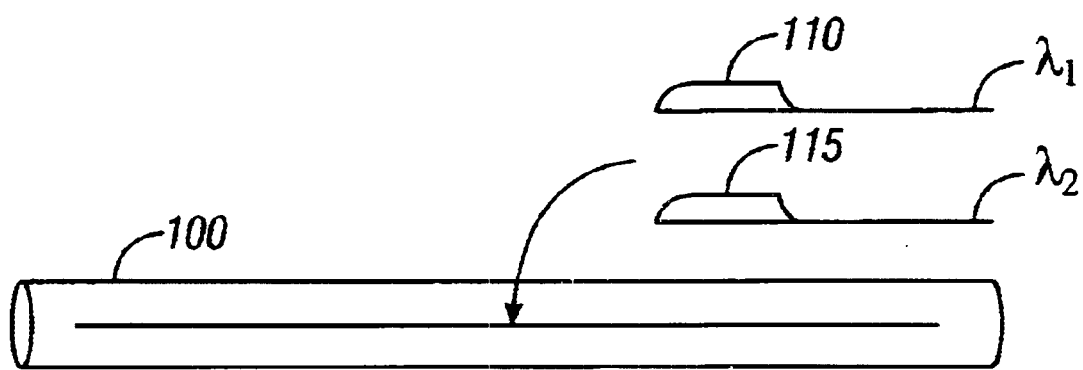
FIG. 1 shows a fiber with a plurality of WDM solitons therein.

Solitons are based on a delicate balance between dispersion effect and the non-linear effect. A temporal soliton is a specially shaped optical pulse which can propagate in a fiber without shape degradation.

When beams with different wavelengths are co-propagating in a single mode fiber 100 as shown in FIG. 1, such as in a wavelength division multiplexed fiber system, interaction among the pulses of the different beams can cause non-linear cross phase modulation. This can effect the integrity of solitons in wavelength division multiplexed beams such at 110 and 115. Different techniques have been attempted to prevent this; often called "dispersion management".

The fundamental equations governing M numbers of co-propagating waves in a nonlinear fiber including the CPM phenomenon are the coupled nonlinear Schrodinger equations $$\frac{\partial A_j}{\partial z} + \frac{1}{V_{gj}} \frac{\partial A_j}{\partial t} + \frac{1}{2}\alpha_j A_j = \frac{1}{2}\beta_{2j}\frac{\partial^2 A_j}{\partial t^2} - \gamma\left(|A_j|^2 + 2\sum_{m\neq j}^{M} |A_m|^2\right)A_j \quad (1)$$

$$(j = 1, 2, 3, \ldots M)$$

Here, for the jth wave, $A_j(z,t)$ is the slowly-varying amplitude of the wave, $v_{gj}$, the group velocity, $\beta_{2j}$, the dispersion coefficient ($\beta_{2j}=dv_{gj}^{-1}/d\omega$), $\alpha_j$, the absorption coefficient, and $$\gamma_j = \frac{n_2 \omega_j}{c A_{eff}} \quad (2)$$

is the nonlinear index coefficient with $A_{eff}$ as the effective core area and $n_2=3.2\times 10^{-16}$ cm$^2$/W for silica fibers, $w_j$ is the carrier frequency of the jth wave, c is the speed of light, and z is the direction of propagation along the fiber.

Introducing the normalizing coefficients $$\tau = \frac{t - (z/v_{g1})}{T_0} \quad (3)$$

$$d_{1j} = (v_{g1} - v_{gj})/v_{g1}v_{gj},$$

$$\xi = z/L_{D1},$$

$$L_{D1} = T_0^2/|\beta_{21}|,$$

and setting $$u_j(\tau,\zeta)=(A_j(z,t)/\sqrt{P_{0j}})\exp(a_j L_{D1}\zeta/2)$$

$$L_{NLj}=1/(\gamma_j P_{0j}) \quad (4)$$

$$L_{Dj}=T_0^2/|\beta_{2j}| \quad (5)$$

Gives $$i\frac{\partial u_j}{\partial \xi} = \frac{sgn(\beta_{2j})L_{D1}}{2L_{Dj}}\frac{\partial^2 u_j}{\partial t^2} - i\frac{d_{1j}}{T_0}L_{D1}\frac{\partial u_j}{\partial t} - \frac{L_{D1}}{L_{NLj}}\left[\exp(-\alpha_j L_{D1}\xi)|u_j|^2 + 2\sum_{m\neq j}^{M}\exp(-\alpha_m L_{D1}\xi)|u_m|^2\right]u_j \quad (6)$$

$$(j = 1, 2, 3, \ldots M)$$

Here, $T_0$ is the pulse width, $P_{0j}$ is the incident optical power of the jth beam, and $d_{1j}$, the walk-off parameter between beam 1 and beam j, describes how fast a given pulse in beam j passes through the pulse in beam 1. In other words, the walk-off length is $$L_{W(1j)}=T_0/|d_{1j}|. \quad (7)$$

So, $L_{W(1j)}$ is the distance for which a faster moving pulse (say, in beam j) completely walked through the slower moving pulse in beam 1. The nonlinear interaction between these two optical pulses ceases to occur after a distance $L_{W(1j)}$. For cross phase modulation to take effect significantly, the group-velocity mismatch must be held to near zero.

Finding the analytic solution of Eq. (6), which is a set of simultaneous coupled nonlinear Schrodinger equations, may be a formidable task. However, it may be solved numerically by the split-step Fourier method, which was used successfully earlier to solve the problem of beam propagation in complex fiber structures, such as the fiber couplers, and to solve the thermal blooming problem for high energy-laser beams. According to this method, the solutions may be advanced first using only the nonlinear part of the equations, and then the solutions are allowed to advance using only the linear part of Eq. (6). This forward stepping process is repeated over and over again until the desired destination is reached. The Fourier transform is accomplished numerically via the well-known fast Fourier transform technique.

It is well know that, for an idealized fiber with no loss, an optical soliton on a single wavelength beam takes the initial form $$u(0,\tau) = N \operatorname{sech}(\tau) \tag{8}$$

where N is the soliton magnitude and $$N^2 = \frac{L_D}{L_{NL}}. \tag{9}$$

It is also known that the single beam soliton equation is $$i\frac{\partial u}{\partial \xi} = -\frac{1}{2}\frac{\partial^2 u}{\partial \tau^2} - N^2[|u|^2]u_j \tag{10}$$

Here, the dispersion length $L_D$ and the nonlinear length $L_{NL}$ are defined earlier in Eq. (6). In the case of anomalous group velocity dispersion (GVD) for soliton, $\operatorname{sgn}(\beta_2) = -1$. For the fundamental soliton case, N=1. This means that when an initial pulse with pulse shape given by Eq.(8), with a normalized amplitude of unity, is launched inside an ideal lossless fiber, the pulse will retain its hyperbolic secant shape without degradation for arbitrarily long distances, e.g., over thousands of kilometers. The delicate balance between the dispersion effect represented by $L_D$ and the nonlinear self phase modulation effect represented by $L_{NL}$ occurs at N=1 for the fundamental soliton. The nonlinear effect on a pulse for a single wavelength beam is embodied in $L_{NL}$, while the dispersion effect on the pulse is embodied in $L_D$.

An embodiment considers the case of multiple wavelength division multiplexed ("WDM") beams in a fiber. Starting with an idealized fiber which is lossless (i.e., $\alpha_j = 0$ for all beams) and which possesses uniform group velocity dispersion (i.e., $v_{gj} = v_g$ for all beams) within the wavelength range under investigation, the equations governing the propagation characteristics of signal pulses are:

$$i\frac{\partial u_j}{\partial \xi} = -\frac{1}{2}\frac{\partial^2 u_j}{\partial \tau^2} - \frac{L_D}{L_{NL}}\left[|u_j|^2 + 2\sum_{m \neq j}^{M} |u_m|^2\right]u_j \tag{11}$$

$(j = 1, 2, 3, \ldots M)$.

The anomalous GVD case in which $\operatorname{sgn}(\beta_2) = -1$ is considered. It is seen from the above equation that the summation term representing the cross phase modulation effect is twice as effective as the self-phase modulation (SPM) effect for the same intensity. This observation also provides the idea that cross phase modulation may be used in conjunction with self-phase modulation on the WDM pulses to counteract the GVD effect, thus producing WDM solitons. Comparing the bracketed terms in Eqs. (10) and (11) shows that if one chooses the correct amplitudes for the initial pulses on WDM beams and retains the hyperbolic secant pulse form, it may be possible to construct a set of initial pulses which will propagate in the same manner as the single soliton pulse case, i.e., undistorted and without change in shape for arbitrarily long distances. If the initial pulses are selected as follows:

$$u_j(0,\tau) = (1+2(M-1))^{-\frac{1}{2}} \operatorname{sech}(\tau)$$

$(j=1,2,3,\ldots M),$ \hfill (12)

where M is the number of WDM beams.

Using these initial pulse forms numerical simulation is carried out to solve Eq. (11). The split-step Fourier method is used. The fiber parameters used for the situation are L, length of fiber equal to 1000 km; $\beta_2$=dispersion coefficient, equal to $-2$ ps$^2$/km; $\gamma$ is the nonlinear index coefficient, equal to 20 W$^{-1}$ km$^{-1}$; $T_0$, pulse width, equal to 10 ps; $L_D$=50 km; and $L_{D1}$=50 km.

Four cases with M=1, 2, 3, 4 are treated. The M=1 case corresponds to the well-known single soliton case; here, the amplitude for the fundamental soliton is 1. For the two-beam case, the amplitude is $(3)^{-\frac{1}{2}}$=0.57735. For the three-beam case, it is $(5)^{-\frac{1}{2}}$=0.4472136. For the four-beam case, it is $(7)^{-\frac{1}{2}}$=0.37796447. In other words, using Eq. (5), the initial power for M beams can be found:

$$P_{0j} = \frac{|\beta_2|}{\gamma T_0^2} \frac{1}{[1+2(M-1)]} \tag{13}$$

The amplitude of the fundamental solitons on WDM multibeams becomes successively smaller as the number of beams is increased. This is because the nonlinear effect becomes more pronounced when more beams are present. Numerical simulation shows that after propagating 1000 km through this fiber the original pulse shape for all these WDM pulses remains unchanged.

As additional examples, if a silica fiber is used at 1.55 um, with a 1 ps pulse, a P of 5 watts is obtained. With the same materials, but a 10 ps pulse, a 50 mw pulse is obtained.

When this is used, normalized power is said to be "1". The anomalous group velocity dispersion case in which sgn $(\beta_{2j})=-1$, is considered. It is seen from the above equation that the summation term in the bracket representing the cross phase modulation (CPM) effect is twice as effective as the self phase modulation (SPM) effect for the same intensity. Hence, cross phase modulation may be used in conjunction with self phase modulation on the WDM pulses to counteract the group velocity dispersion effect. WDM solitons are thus produced.

Comparing the bracketed terms in Equations (10) and (11) shows that if one chooses the correct amplitudes for the initial pulses on WDM beams and retains the hyperbolic secant pulse form, it may be possible to construct a set of initial pulses which will propagate in the same manner as the single soliton pulse case, i.e., undistorted and without change in shape for arbitrarily long distances. Let us choose the initial pulses as follows:

$$u_j(0,\tau) = (1+2(M-1))^{-\frac{1}{2}} \operatorname{sec} h(\pi)$$

$(j=1, 2, 3, \ldots M),$ \hfill (12)

where M is the number of WDM beams.

Using these initial pulse forms numerical simulation was carried out to solve Equation (11). The split-step Fourier method was used. The fiber parameters used for the simulation are:

L=length of fiber=1000 km $\beta_2$=dispersion coefficient=-2 ps$^2$/km $\gamma$=nonlinear index coefficient=20 w$^{-1}$km$^{-1}$ $T_0$=pulse width=10 ps.

$L_D$=50 km $L_{NL}$=50 km. Four cases with M=1, 2, 3, 4 were treated. The M=1 case corresponds to the well known single soliton case; here, the amplitude for the fundamental soliton is 1. For the 2-beam case, the amplitude is $(3)^{-\frac{1}{2}}$=0.57735. For the 3-beam case, it is $(5)^{-\frac{1}{2}}$= 0.4472136. For the 4-beam case, it is $(7)^{-\frac{1}{2}}$= 0.37796447. It is noted that the amplitude of the fundamental solitons on WDM multi-beams becomes successively smaller as the number of beams is increased. This is because the nonlinear effect becomes more pronounced when more beams are present.

Another way of looking at the soliton is that.the correct power to form a soliton is obtained by the value P;

$$P = \frac{\beta_2}{\gamma g T_0^2}$$

where beta 2 is the dispersion coefficient, which is a number that depends on the fiber; gamma is the non linear coefficient of the fiber material, and $T_0$ is proportional to the pulse width.

Numerical simulation shows that after propagating 1000 km through this fiber the original pulse shape for all these WDM pulses remains unchanged. It thus appears that the initial forms chosen for the pulses on WDM beams are the correct soliton forms for WDM beams.

What is claimed is:

1. A method, comprising:
   forming a plurality of wavelength division multiplexed hyperbolic secant shaped optical beams; and
   simultaneously modulating all of said plurality of secant shaped optical beams as wavelength division multiplexed beams in a hyperbolic secant form, and all of said beams being initially modulated with a specified effective power that forms wavelength division multiplexed solitons.

2. A method as in claim 1 wherein said modulating comprises determining a single effective power for said] optical beams which allows said solitons to exist.

3. A method, comprising
   forming a plurality of wavelength division multiplexed hyperbolic secant shaped optical beams; and
   modulating said secant shaped optical beams as wavelength division multiplexed beams in a hyperbolic secant form, and said beams being initially modulated with a specified effective power that forms wavelength division multiplexed solitons, wherein said modulation comprises determining a single effective power for said optical beams which allows said solitons to exist, wherein said amplitude is selected such that a self phase modulation effect and cross-phase modulation effect counteract a group velocity dispersion effect to form said solitons which will propagate in a fiber for at least 10000 km.

4. A method as in claim 2, wherein there are M wavelength division multiplexed beams, and said effective power is a function of M where M is a number of said multiplexed beams, M being an integer greater than 1.

5. A method as in claim 4, wherein there are M=2 beams, and the amplitude is $1/\sqrt{3}$ times the square root of the specified power level for a single beam soliton.

6. A method as in claim 4, wherein the specified amplitude level is $$\frac{1}{\sqrt{1+2(M-1)}}$$

times the square root of the specific power level for a single beam soliton, where M is the number of beams, and M>1.

7. A method of conducting beams, comprising:
   choosing a series of initial pulses, each of which have a hyperbolic secant shape, and which have effective powers which are set to allow soliton transmission of all of the serves of pulses, in a wavelength division multiplexed form, wherein the specified amplitude level is $$\frac{1}{\sqrt{1+2(M-1)}}$$

times the square root of the specific power level for a single beam soliton, where M is the number of beams, and M>1.

8. A method of keeping parallel beams of information from degradation when propagating through an optical fiber comprising: forming WDM solitons which has a specified amplitude level is $$\frac{1}{\sqrt{1+2(M-1)}}$$

times the square root of the specific power level P for a single beam soliton, where M is the number of beams, and M>1, and $$P = \frac{\beta_2}{\gamma \cdot T_0^2}$$

which pulses have approximately a hyperbolic secant amplitude envelope and which also have a pulse width $\tau$ and a peak power related where $\beta_2$ is the dispersion coefficient, $\delta$ is the nonlinear coefficient of the fiber material, and $T_0$ is a value that is proportional to the pulse width.

9. A method, comprising
   forming a plurality M of wavelength division multiplexed beams on a single fiber, which have powers that are set to have uniform group velocity dispersion, and which are related such that the sign of $(\beta_{2j})$=-1, and which have an initial form $u_j(0,\tau)=\sqrt{1+2(M-1)}$sec h($\tau$), where j is an integer<=M, and M is an integer >1, $\beta$ is the dispersion coefficient, and $\tau$ is the pulse width.

10. A method comprising:
    forming a plurality of wavelength division multiplexed shaped co-propagating parallel pulses on wavelength division multiplexed (WDM) optical beams; and
    modulating said optical beams as wavelength division multiplexed beams co-propagating pulses in a soliton form, and said wavelength division multiplexed beams being initially modulated with a specified effective power that forms wavelength division multiplexed solitons and which power is dependent on a number of said pulses.

11. A method as in claim 1, wherein said modulating comprises determining the effective power for said all of said beams, which allows said WDM solitons to exist.

12. A method as in claim 10, wherein said amplitude for the co-propagating bit-parallel pulses is selected such that a self phase modulation effect and cross-phase modulation effect counteract a group velocity dispersion effect to form said solitons which will propagate in a fiber for at least 10000 km.

13. A method as in claim 11, wherein there are M co-propagating beams which form bit-parallel pulses on M wavelength division multiplexed beams, and said effective power is a function of M, where M is an integer >1 representing the number of co-propagating bit-parallel pulses.

14. A method as in claim 13, wherein there are M=2 co-propagating bit-parallel pulses on 2 WDM beams, and the amplitude is $1/\sqrt{3}$ times the square root of the specified power level for a single beam soliton.

15. A method as in claim 13, wherein the specified amplitude lever is $$\frac{1}{\sqrt{1+2(M-1)}}$$

times the square root of the specific power level for a single beam soliton, where M is the number of co-propagating bit-parallel pulses on WDM beams, and M>1.

16. A communication system, operating to transmit bit-parallel data, comprising:

an optical cable, and an optical modulating element forming a plurality of wavelength division multiplexed hyperbolic secant shaped co-propagating pulses on wavelength division multiplexed (WDM) optical beam and modulating said secant shaped WDM optical beams as wavelength division multiplexed beams in a hyperbolic secant form with a specified effective power that forms wavelength division multiplexed solitons, wherein said modulating element selects an amplitude for the co-propagating parallel pulses is selected such that a self phase modulation effect and cross-phase modulation effect counteract a group velocity dispersion effect to form said solitons which will propagate in a fiber for at least 10000 km.

17. A communication system, operating to transmit bit-parallel data, comprising:

an optical cable, and an optical modulating element forming a plurality of wavelength division multiplexed hyperbolic secant shaped co-propagating pulses on wavelength division multiplexed (WDM) optical beam and modulating said secant shaped WDM optical beams as wavelength division multiplexed beams in a hyperbolic secant form with a specified effective power that forms wavelength division multiplexed solitons, wherein said modulating element producing M co-propagating bit-parallel pulses on M wavelength division multiplexed beams, and said effective power is a function of M, where M is the number of co-propagating bit-parallel pulses and M>1.

18. A system as in claim 17, wherein said modulating element producing M=2 co-propagating parallel pulses on 2 WDM beams, and the amplitude is $1/\sqrt{3}$ times the square root of the specified power level for a single beam soliton.

19. A system as in claim 18, wherein the specified amplitude level is $$\frac{1}{\sqrt{1+2(M-1)}}$$

times the square root of the specific power level for a single beam soliton, where M is the number of co-propagating bit-parallel pulses on WDM beams, and M>1.

* * * * *